Nov. 7, 1939. J. W. KAYE 2,179,013
STEERING WHEEL
Filed May 26, 1937 2 Sheets-Sheet 2

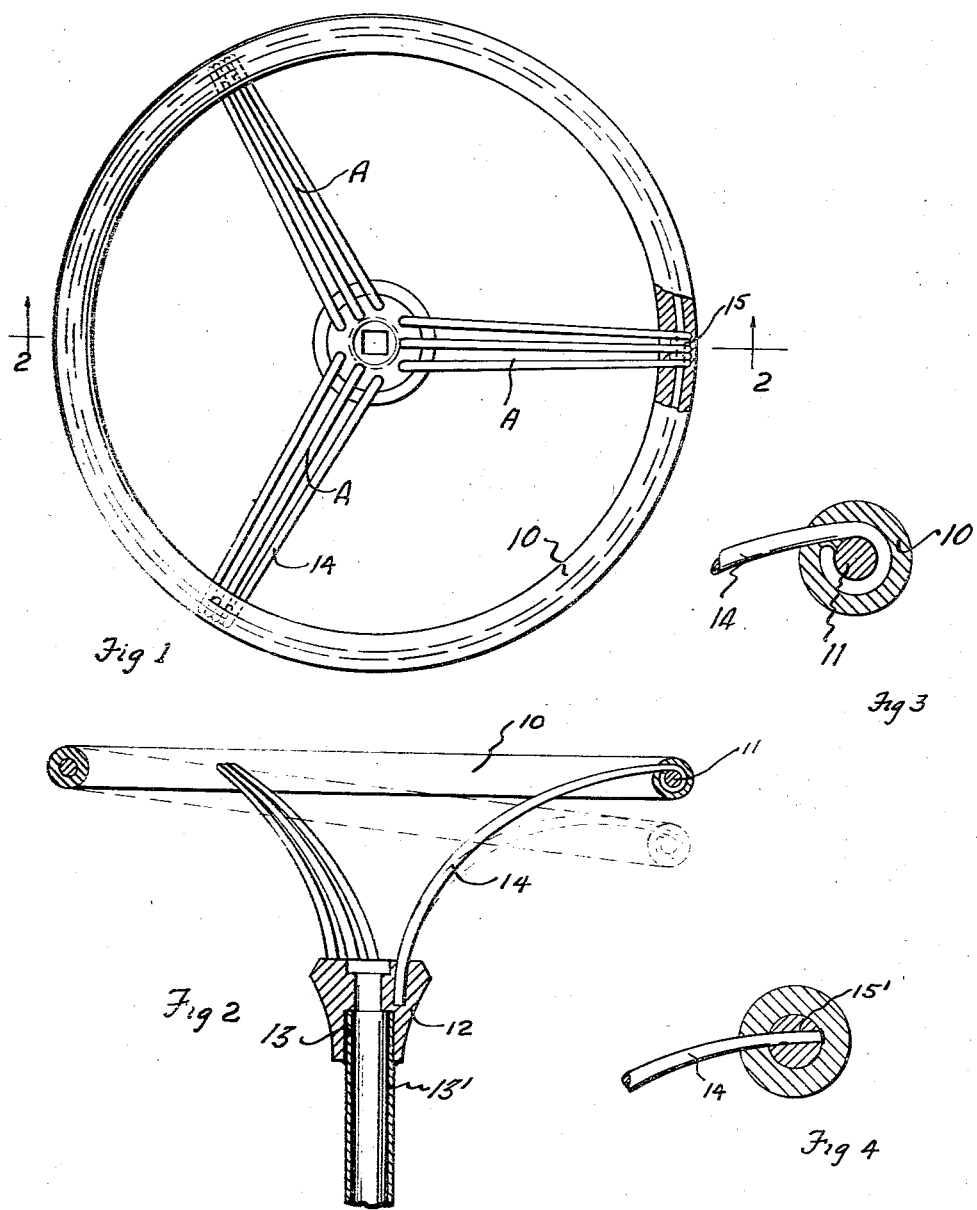

JOHN W. KAYE
INVENTOR

BY
ATTORNEY

Patented Nov. 7, 1939

2,179,013

UNITED STATES PATENT OFFICE 2,179,013

STEERING WHEEL

John W. Kaye, San Antonio, Tex.

Application May 26, 1937, Serial No. 144,893

10 Claims. (Cl. 74—552)

This invention relates to new and useful improvements in steering wheels.

One object of the invention is to provide an improved steering wheel, which is particularly applicable to motor vehicles and which is constructed so as to minimize road shock and increase driving comfort.

An important object of the invention is to provide an improved steering wheel construction wherein the rim of the wheel is disposed in a plane some distance above the hub thereof, being connected to said wheel by curved spokes; the spokes being flexible within certain limits and having such a curvature that a downward pressure on the rim flexes said spokes to permit limited movement of the wheel rim, whereby danger of injury to the operator by sudden contact with the rim due to an accident, or for any other reason, is obviated.

Another object of the invention is to provide an improved steering wheel which is so constructed and connected to the steering post of the motor vehicle that said post may be shortened sufficiently to eliminate danger of the operator being pierced or impaled thereon, in case of accident, thereby greatly reducing danger of serious injury.

A further object of the invention is to provide a steering wheel including flexible elements for connecting the wheel rim with the hub with improved means for attaching the elements to the rim and hub, whereby a sturdy construction is had.

A construction designed to carry out the invention will be hereinafter described, together with other features of the invention.

Figure 8:
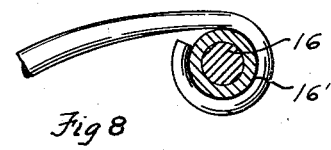
Figure 5:
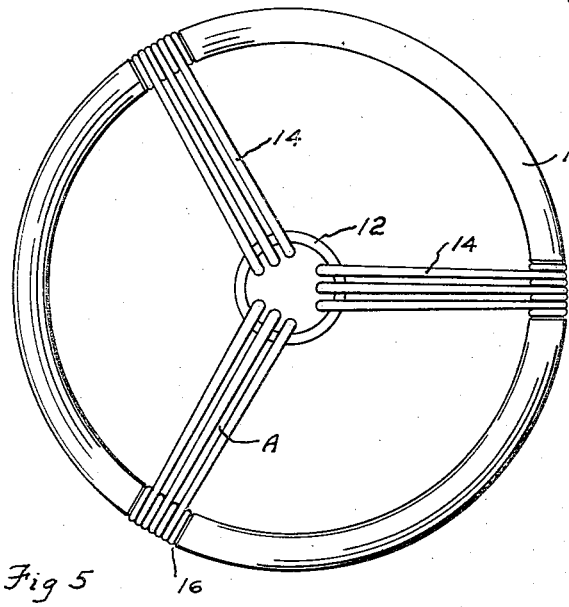
Figure 6:
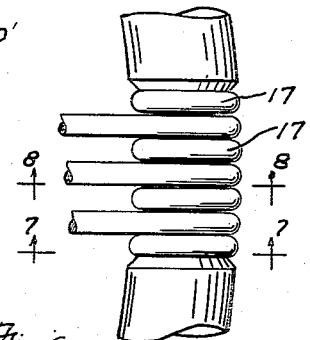
Figure 7:
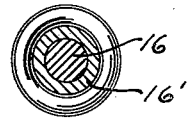
Figure 11:
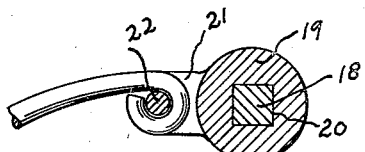
Figure 9:
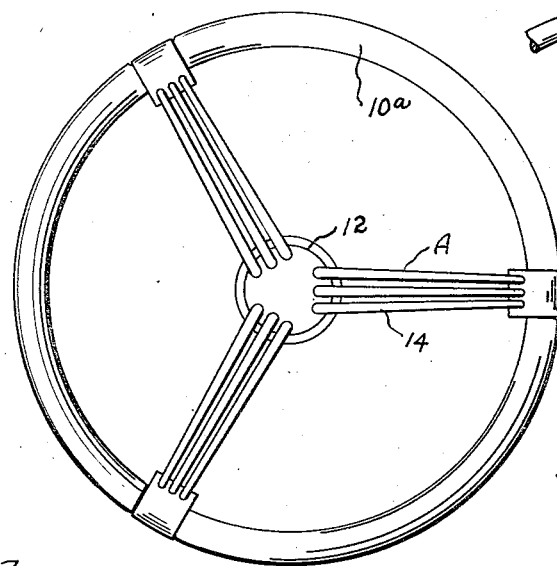
Figure 10:
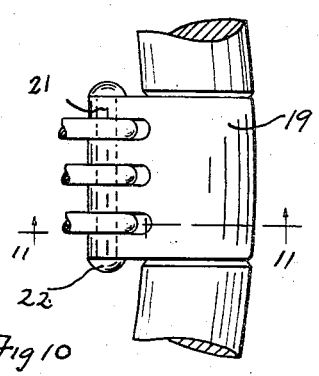

The invention will be more readily understood from a reading of the following specification and by reference to the accompanying drawings, in which an example of the invention is shown, and wherein:

Figure 1 is a plan view of a steering wheel, constructed in accordance with the invention and having a portion of its rim shown in section to illustrate the connection of the spoke with said rim, Figure 2 is a transverse, vertical, sectional view taken on the line 2—2 of Figure 1, Figure 3 is an enlarged transverse, sectional view taken through the rim of the wheel and showing the connection of one of the spoke rods thereto, Figure 4 is a view similar to Figure 3 and showing another method of attaching the spoke rods to the wheel rim, Figure 5 is a plan view of another form of the invention, Figure 6 is an enlarged plan of the connection between the spoke and the wheel rim, Figure 7 is a transverse, sectional view, taken on the line 7—7 of Figure 6, Figure 8 is a transverse, sectional view taken on the line 8—8 of Figure 6, Figure 9 is a plan view showing a modified form of the invention, Figure 10 is an enlarged plan view of the connection between each spoke and the wheel rim, and Figure 11 is a transverse, sectional view taken on the line 11—11 of Figure 10.

In the drawings, the numeral 10 designates the rim of the steering wheel. This rim includes a core 11 which is preferably constructed of metal, and which is preferably cylindrical in cross-section. The core 11 is surrounded by the material of which the rim proper is made and this material is preferably hard rubber or the like. A hub 12 is provided with a suitable socket or bore 13, whereby said hub may be mounted on the upper end of the steering post 13'. The upper end of the bore 13 of said hub is reduced so as to receive the steering rod to which it is connected in the usual manner (not shown). The connection between the hub 12 and the steering column or post is not shown because it forms no part of the present invention and the hub 12 may be mounted on said column or post in any desired manner.

For connecting the hub 12 with the wheel rim 10, a plurality of spokes A are provided. The spokes are spaced equally around the hub and rim and, as clearly shown in Figure 1, each spoke includes a plurality of rods 14, which rods are preferably cylindrical in cross-section. The rods 14 are curved, as clearly shown in Figure 2, and are preferably reduced or tapered at their upper ends. The lower end of each rod 14 is embedded within the hub 12 and it is noted that that portion of the rod within the hub extends substantially vertically therein, whereby the rod projects from the top of the hub 12. The curvature of the rod may vary but it is preferable that it be substantially a quarter circle or quarter ellipse. Due to its curvature the rod projects upwardly and outwardly from the hub 12 and its upper end encircles the cylindrical metallic core 11 of the wheel rim and is embedded in the material surrounding said core, as is clearly shown in Figure 3. The upper ends of the three rods 14 which form one spoke A are spaced from each other on the core 11 by washers or rings 15 and it is preferable that the lower ends of said rods are spaced further apart on the hub 12 than the upper ends of the rods are spaced from each other on the core 11.

Each rod 14 is flexible within certain limits and obviously the curvature of the rods locates the wheel rim 10 in a plane which is spaced from the plane of the hub 12. With such arrangement, it is possible to shorten the usual steering post or column which normally extends up to the plane of the wheel rim 10. By shortening the steering post, it will be evident that in case of an accident, the possibility of said steering post piercing the operator, is lessened and therefore the danger of serious injury is substantially reduced. Also, since the rods 14 which form the spokes A are flexible and curved upwardly and outwardly from the hub 12, a downward thrust on the rim 10 will cause said spokes to flex, which will move the rim to the position shown in dotted lines in Figure 2. Thus, in case of accident or from any other cause, the driver or operator of the vehicle is thrown against the steering wheel, said wheel will flex under the jar, whereby injury to the operator or driver is eliminated. The flexibility of the spokes A also adds much to the driving comfort as road shocks and jars are absorbed by the flexible spokes, rather than transmitted to the driver grasping the rim 10. Since the rods 14 of the spokes A are embedded vertically within the hub 12, a positive connection between the rim and hub is had, whereby turning of the rim will assure a rotation of the hub. By spreading the lower ends of the rods 14 of each spoke with relation to their upper ends, a more positive connection between said hub and rim is obtained.

It is pointed out that the upper ends of the rods 14 are preferably welded or otherwise secured to the metallic core 11 of the rim, whereby said spokes are not movable with relation to the rim. Therefore the torsional strain in the core is carried by the spokes A and any pressure imposed on the wheel is taken entirely by the flexibility of said spokes. Another method of fastening the upper ends of the rods 14 to the core 11 is shown in Figure 4. In this form, the upper end of each rod 14, instead of encircling the core 11 as shown in Figure 3, extends through a transverse opening 15' which is provided in the metallic core 11. Spot welding, or other means may be employed for securing this end of the rod permanently within the opening 15'. The effect of this method of fastening is exactly the same as that shown in the first form, the only difference being that it is unnecessary to wind the end of each rod around the core, it being merely necessary to insert said end into the opening 15' provided therefor.

In Figures 5 to 8, a modified form of steering wheel is shown. In this form the spokes A are composed of the rods 14 which are secured to the hub 12 in the same manner. A wheel rim 10' is provided in place of the rim 10 and has reduced portions 16 spaced at intervals therearound, one of the reduced portions being provided for each spoke A, as is clearly shown in Figure 5. A metallic sleeve 16' surrounds each reduced portion and is rotatable thereon. The outer or upper ends of the rods 14 encircle the sleeve 16' of the rim, as is clearly shown in Figure 8. The encircling ends of the rods 14 are permanently fastened by spot welding or otherwise to the exterior periphery of the sleeve 16' and obviously, since the sleeve may rotate on the reduced portion 16 of the wheel rim 10', the outer ends of the rods 14 are rotatable with relation to the rim. The outer ends of the rods 14 of each spoke are spaced from each other on the sleeve 16' by means of collars or rings 17. The rings or collars are of such width that the outer ends of the rods are spaced closer to each other than are the inner ends thereof which are secured to the hub 12.

In effect, the construction shown in Figures 5 to 8 is substantially the same as that shown in the forms of Figures 1 to 4, the only difference being the method of securing the outer ends of the spokes A to the wheel rim 10'. With the construction shown in Figure 5, it will be manifest that the spokes may undergo a rotation with relation to the rim 10' when a downward pressure is exerted on the wheel rim. Thus the torsional strain is transferred to the rim rather than being carried by the spokes A. The rods 14 in Figure 5 are, of course, flexible within certain limits, whereby road shocks are absorbed and movement of the rim with relation to the hub is permitted.

Still another form of the invention is shown in Figures 9 to 11, wherein a wheel rim 10a is formed with squared portions 18 which are located in spaced positions therearound. An anchor block 19 having a square bore 20 is mounted on each squared portion of the rim 10a. The block 19 is formed with a plurality of inwardly extending ears 21 and a transverse pin 22 extends through the ears 21, and is clearly shown in Figure 10. The upper ends of the rods 14 which form the spokes are arranged to be inserted between the ears 21 and these ends encircle the transverse pin 22 as is shown in Figure 11. The encircling end of each rod is rotatable with relation to the pin 22 and since the rods are inserted in the spaces between the ears 21, it will be evident that said ears space the rods from each other. The effect of this construction is exactly the same as that of the forms shown in Figures 5 to 8 in that the flexibility of the rods 14 permit a movement of the rim 10a with relation to the hub 12. Since the upper ends of the rods 14 forming the spokes A are rotatable on the pin 22, the turning or rotation occurs at the pin 22, while the torsional strain is transferred to the rim core. It is noted that various methods may be worked out, for fastening the rods 14 to said rim.

It is pointed out that in all forms the hub 12 is located in a plane which is spaced from the plane in which the rim of the wheel is disposed. This permits the steering post on which said post is mounted to be shortened, whereby danger of said post penetrating or piercing the operator in the event of an accident, is eliminated. The lower ends of the rods 14 extend substantially vertically within the hub 12, whereby a positive connection between the rim and the hub is had by means of the rods.

What I claim and desire to secure by Letters Patent is:

1. A steering wheel including, a hub adapted to be connected to the steering post of a motor vehicle, a plurality of curved spokes extending upwardly and outwardly of the hub and having one end secured thereto, a wheel rim, and means for rotatably fastening the other ends of the spokes to the rim.

2. A steering wheel including, a hub adapted to be connected to the steering post of a motor vehicle, a plurality of curved spokes extending upwardly and outwardly of the hub and having one end secured thereto, a wheel rim, and means for rotatably fastening the other ends of the spokes to the rim, the spokes being flexible to permit movement of the rim relative to the hub.

3. A steering wheel including, a hub adapted to be connected to the steering post of a motor vehicle, a plurality of curved spokes extending upwardly and outwardly of the hub, each spoke having its lower end embedded within the hub with the embedded portion extending substantially vertically of said hub, a wheel rim, and means for rotatably fastening the other ends of the spokes to the rim, the spokes being flexible to permit movement of the rim relative to the hub.

4. A steering wheel including, a hub adapted to be connected to the steering post of a motor vehicle, a plurality of curved spokes extending upwardly and outwardly of the hub, each spoke having its lower end embedded within the hub with the embedded portion extening substantially vertically of said hub, a wheel rim having reduced portions thereon, a rotatable sleeve on each reduced portion, and means for fastening the upper end of each spoke to one of the sleeves whereby said upper end of each spoke may turn on the rim.

5. A steering wheel including, a hub adapted to be connected to the steering post of a motor vehicle, a plurality of curved spokes extending upwardly and outwardly of the hub, each spoke having its lower end embedded within the hub with the embedded portion extending substantially vertically of said hub, a wheel rim, a plurality of blocks affixed on said rim, and means for rotatably fastening the upper ends of the spokes to the blocks, whereby said upper ends may rotate relative to the rim.

6. A steering wheel including, a hub adapted to be connected to the steering post of a motor vehicle, a plurality of curved spokes extending upwardly and outwardly of the hub, each spoke comprising a plurality of curved flexible elements extending substantially parallel to each other, each element having its lower end embedded in the hub, said embedded portion extending vertically of the hub, a wheel rim, and means for rotatably fastening the upper ends to the spoke elements to said rim.

7. A steering wheel including, a hub arranged to be fastened upon the upper end of the steering post of a motor vehicle, a plurality of spoke rods having their lower ends directed downwardly into the hub from the top thereof and fastened in said hub, each spoke rod being curved upwardly and outwardly a substantial distance, a wheel rim having a core embedded therein, and means for securing the upper ends of the spokes to the core of the rim, the lower ends of the spoke rods providing an upright support and the curved portions providing universal resiliency, whereby the rim may yield circumferentially as well as deflect from its normal plane.

8. A steering wheel including, a hub arranged to be fastened upon the upper end of the steering post of a motor vehicle, a plurality of spoke rods having their lower ends directed downwardly into the hub from the top thereof and fastened in said hub, each spoke rod being curved upwardly and outwardly a substantial distance, a wheel rim having a core embedded therein, and means for securing the upper ends of the spokes to the core of the rim, whereby said rim is disposed a considerable distance above the hub, the lower ends of the spoke rods providing an upright support and the curved portions providing universal resiliency, whereby the rim may yield circumferentially as well as deflect from its normal plane and also whereby all deflections of the rim are confined to the planes above the top of the hub.

9. A steering wheel including, a hub arranged to be fastened upon the upper end of the steering post of a motor vehicle, resilient spoke arms each composed of a plurality of spoke rods grouped in close proximity and having their lower ends directed downwardly into the hub from the top thereof and fastened in said hub, each spoke rod being curved upwardly and outwardly a substantial distance, a wheel rim having a core embedded therein, and means for securing the upper ends of the spoke rods to the core of the rim, the resilient arms being of such length and such curvature as to support the rim a considerable distance above the hub and being sufficiently rigid to impart rotation from the rim to the hub but sufficiently flexible to permit deflections in various directions.

10. A steering wheel including, a hub arranged to be fastened upon the upper end of the steering post of a motor vehicle, a plurality of spoke rods having their lower ends rigidly fastened to the hub, each spoke rod being curved upwardly and outwardly a substantial distance, a wheel rim having a core embedded therein, and means for pivotally connecting the upper ends of the spoke rods with the core of the rim, whereby said rim co-acts with said spoke rods to enhance the flexibility of the steering wheel.

JOHN W. KAYE.